United States Patent [19]

Davin

[11] Patent Number: 5,168,389
[45] Date of Patent: Dec. 1, 1992

[54] DYE LASER AMPLIFIER INCLUDING A LOW TURBULENCE, STAGNATION-FREE DYE FLOW CONFIGURATION

[75] Inventor: James Davin, Gilroy, Calif.

[73] Assignee: The United States of America as represented by the United States Department of Energy, Washington, D.C.

[21] Appl. No.: 911,193

[22] Filed: Sep. 22, 1986

[51] Int. Cl.[5] .............................................. H01S 3/02
[52] U.S. Cl. ..................................... 359/333; 372/51; 372/53; 372/54
[58] Field of Search ............................ 372/51, 53, 54; 330/4.3

[56] References Cited

U.S. PATENT DOCUMENTS

| | | | |
|---|---|---|---|
| 3,654,568 | 4/1972 | Schimitschek | 372/54 |
| 3,678,410 | 7/1972 | Kocher et al. | 372/54 |
| 3,688,216 | 8/1972 | Kocher et al. | 372/54 |
| 3,713,044 | 1/1973 | Itzkan | 372/53 |
| 3,717,825 | 2/1973 | Gerlach | 372/54 |
| 3,913,033 | 10/1975 | Tuccio et al. | 372/54 X |
| 4,178,565 | 12/1979 | Morton | 372/54 |
| 4,281,294 | 7/1981 | Volkin | 372/53 X |

FOREIGN PATENT DOCUMENTS 2646692  4/1978  Fed. Rep. of Germany ........ 372/54

Primary Examiner—Mark Hellner
Attorney, Agent, or Firm—Miguel A. Valdes; Henry P. Sartorio; William R. Moser

[57] ABSTRACT

A large (high flow rate) dye laser amplifier in which a continuous replenished supply of dye is excited by a first light beam, specifically a copper vapor laser beam, in order to amplify the intensity of a second different light beam, specifically a dye beam, passing through the dye is disclosed herein. This amplifier includes a dye cell defining a dye chamber through which a continuous stream of dye is caused to pass at a flow rate of for example 30 gallons/minute, a specifically designed support vessel for containing the dye cell and a screen device for insuring that the dye stream passes into the dye cell in a substantially turbulent free, stagnation-free manner.

6 Claims, 4 Drawing Sheets

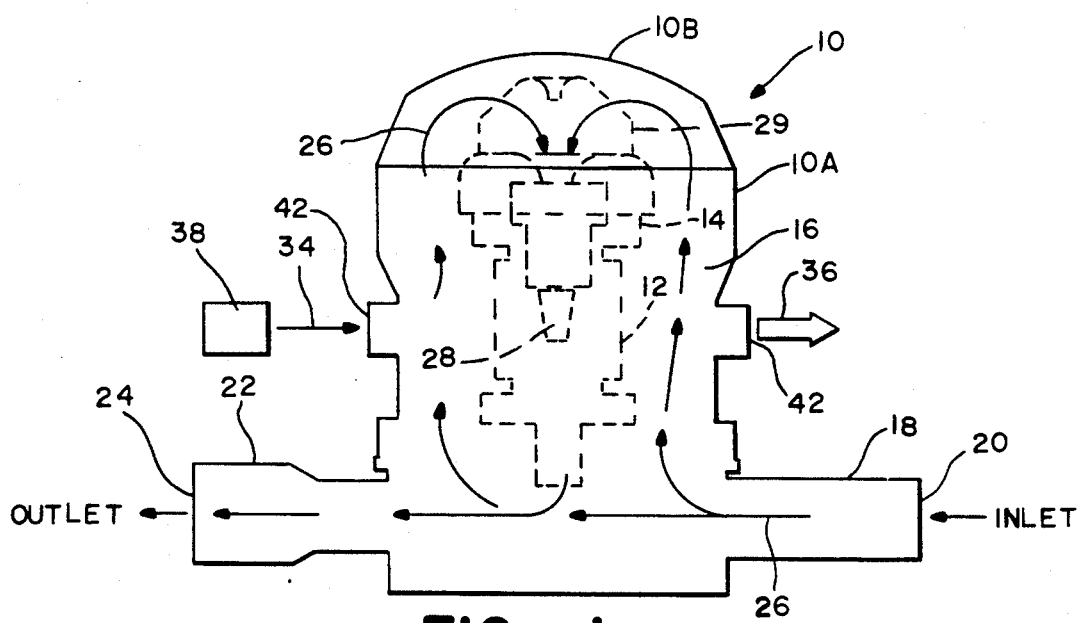
FIG.—1
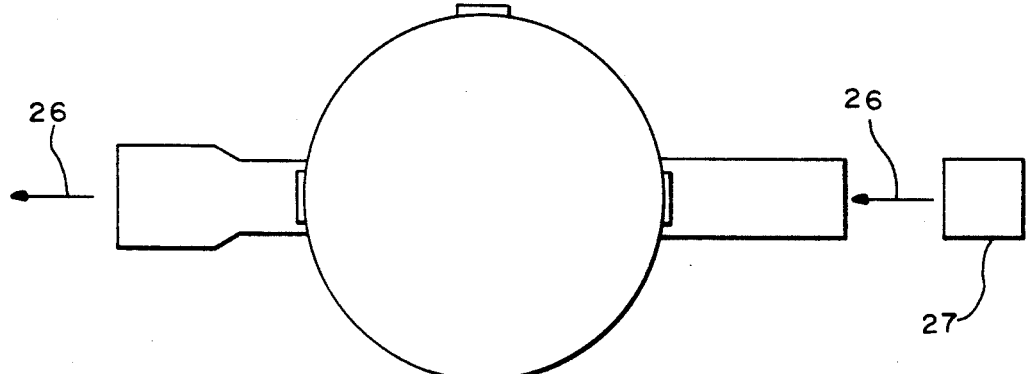
FIG.—2
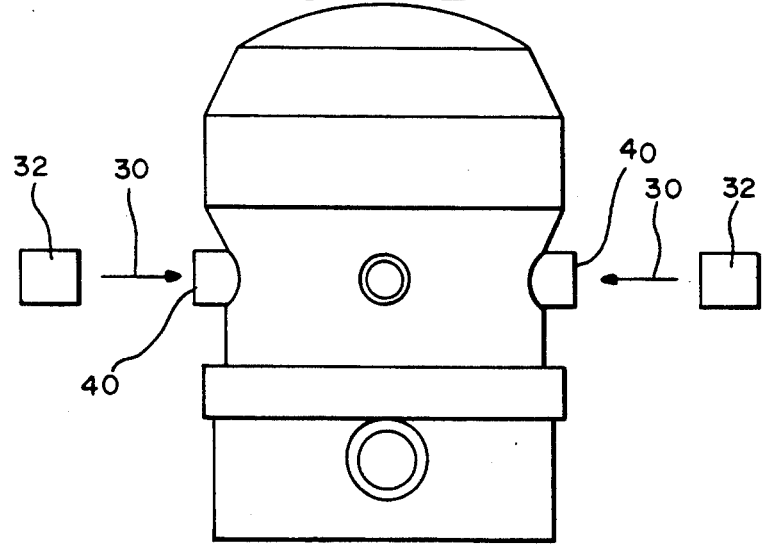
FIG.—3

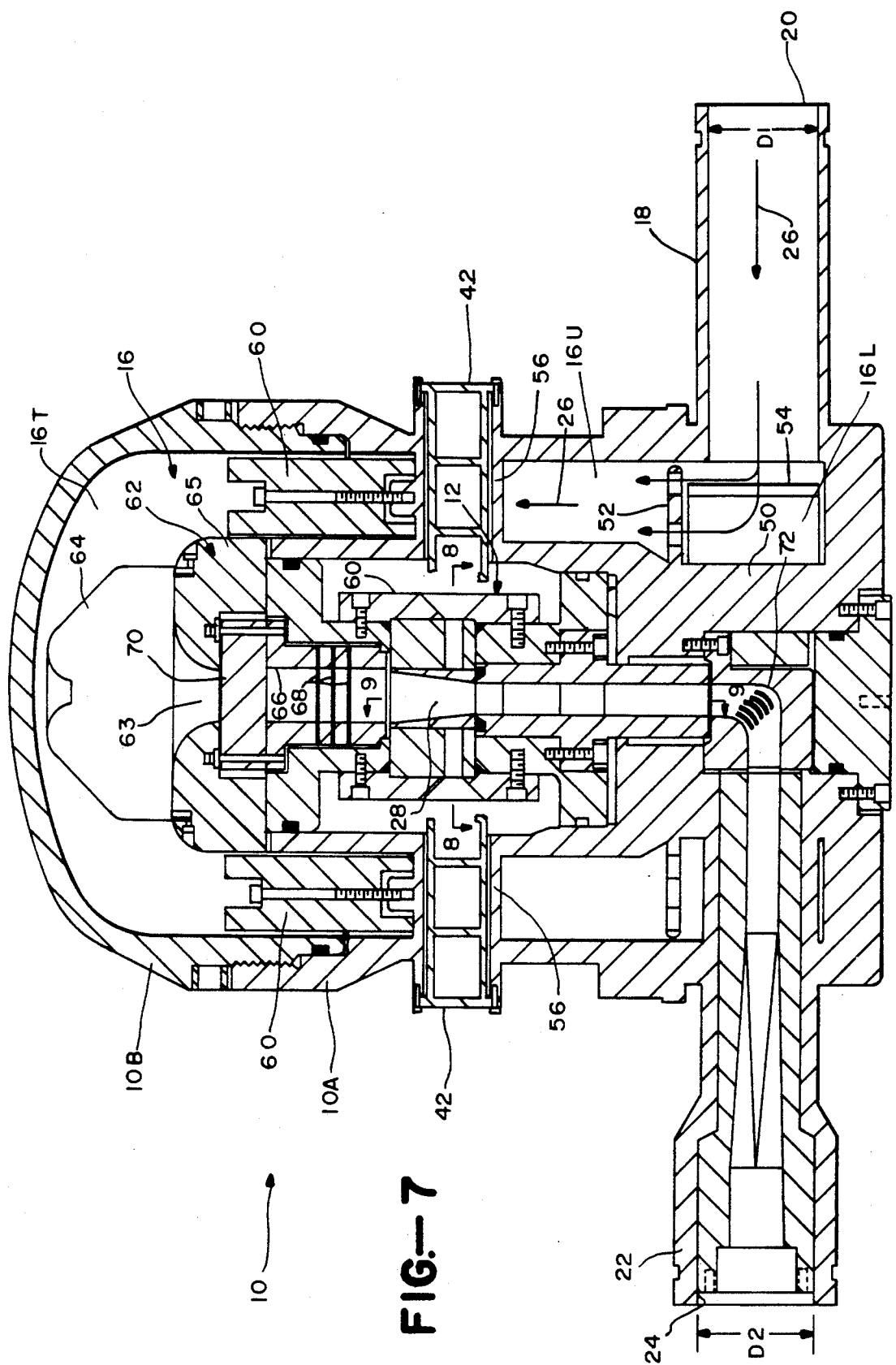

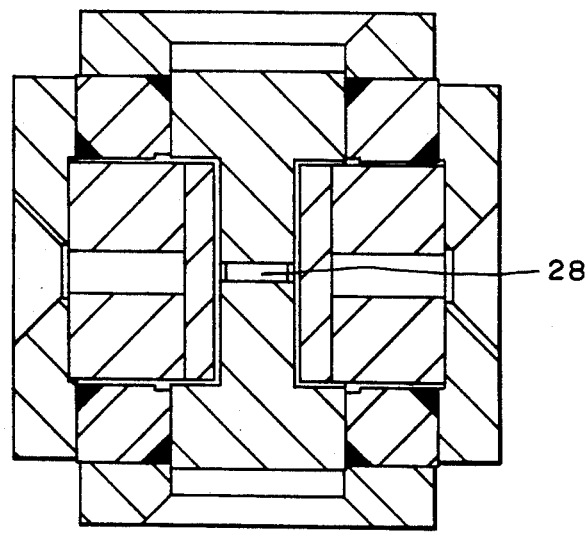
FIG.— 8
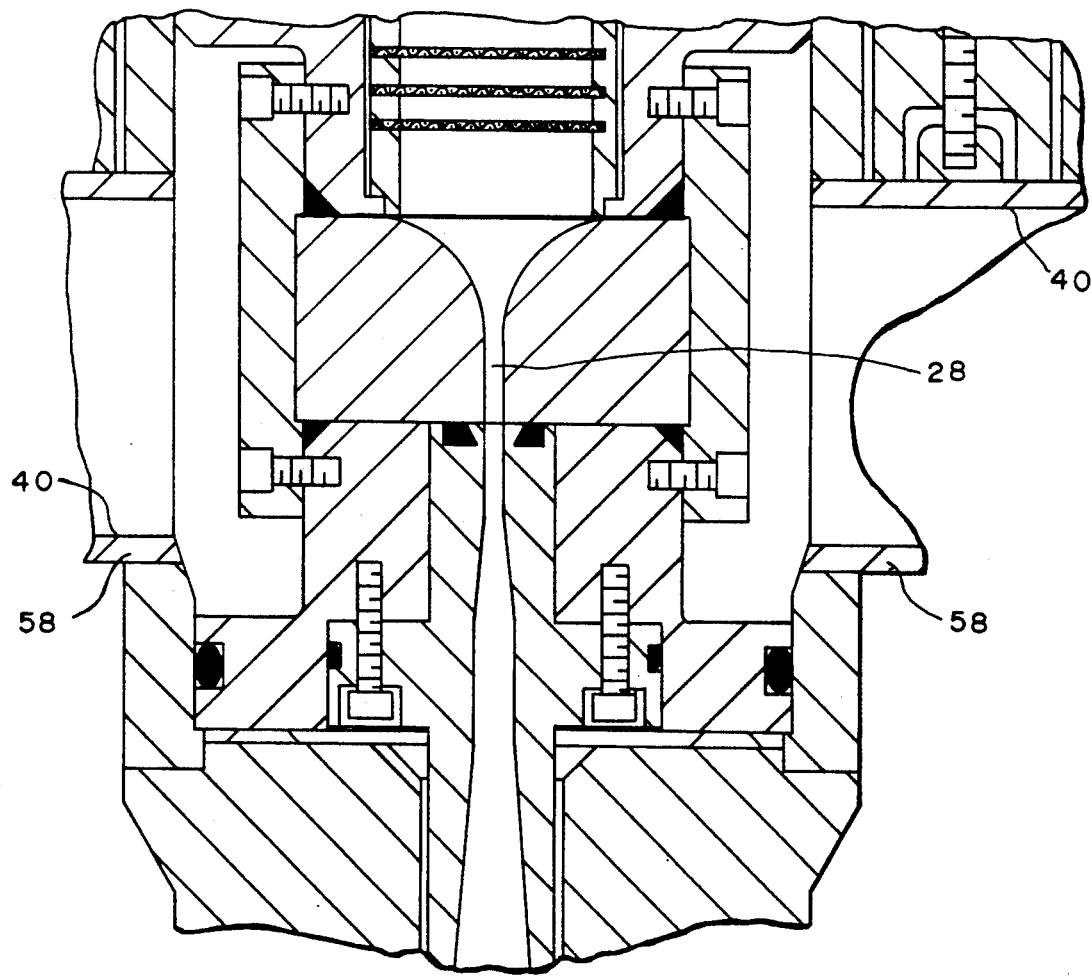
FIG.— 9

DYE LASER AMPLIFIER INCLUDING A LOW TURBULENCE, STAGNATION-FREE DYE FLOW CONFIGURATION

The U.S. Government has rights in this invention pursuant to contract number W-7405-ENG-48 between the U.S. Department of Energy and the University of Calif. for the operation of the Lawrence Livermore National Laboratory.

BACKGROUND OF THE INVENTION

The present invention relates generally to a dye laser amplifier including a dye cell having an internal chamber in which a continuous replenished supply of dye is excited by a first light beam in order to amplify the intensity of a second, different light beam passing through the dye and more particularly to a relatively high flow rate amplifier including a specifically designed arrangement for causing its dye stream to pass through its dye cell in a low turbulence, stagnation-free way.

When a dye laser amplifier of the general type just recited is designed to operate at relatively low flow rates, for example on the order of 10 gallons/minute, it is relatively easy to cause its continuous stream of dye to pass through its dye cell in a relatively turbulent free manner. However, it is more difficult to provide a turbulent-free flow path through the dye cell when the dye laser amplifier is designed to operate at flow rates greater than 30 gallons/minute. As will be seen hereinafter, the present invention is directed to a particularly designed, uncomplicated and yet reliable way to insure that this high flow rate stream passes through the dye cell in a substantially turbulent-free and also stagnation-free way.

SUMMARY OF THE INVENTION

In view of the foregoing, it is an object of the present invention to provide an uncomplicated and yet reliable way to cause a continuous stream of dye to pass through a dye cell assembly-forming part of a dye laser amplifier at a relatively high flow rate in a uniform and stable manner.

A more particular object of the present invention is to cause said last-mentioned continuous stream of dye to make a 180° turn in the entrance plenum just before entering the dye cell and to do so in a stable and substantially stagnation-free manner.

Another particular object of the present invention is to provide an uncomplicated and yet reliable screen which is disposed within the path of the last-mentioned dye stream as the latter makes its 180° turn and which is configured to act on the dye stream so that the latter enters the dye cell assembly in a uniform and stable manner.

As indicated above, the dye laser amplifier disclosed herein includes a dye cell assembly defining a dye chamber having an inlet through which a continuous, replenished stream of dye is caused to flow and in which the stream of dye is excited by a first light beam in order to amplify the intensity of a second different light beam passing through the dye. The dye laser amplifier also includes a vessel having a first opening for accommodating passage of the first beam into the dye chamber, a pair of second openings for accommodating the passage of the second beam through the dye chamber, and means defining a vessel chamber through which the continuous stream of dye must pass before entering the dye cell. The vessel also includes an inlet for accommodating passage of the stream into the vessel chamber before entering the dye cell assembly and an outlet for accommodating passage of the stream out of the vessel after leaving the dye cell assembly.

As will be described in more detail hereinafter the dye stream entering the vessel chamber just recited through its inlet is first caused to flow vertically upward toward the top of the vessel chamber in an annular passage and then vertically downward in a rectangular passage upon reaching the top of the vessel chamber, making a 180° turn and then passes into the inlet of the dye chamber and through the latter just before exiting the vessel chamber. As stated previously, it is intended that the dye stream be operated at relatively high flow rates greater than 30 gallons/minute. Therefore, unless the stream is carefully controlled as it makes its 180° turn just before entering the dye cell it will enter the latter in an unstable and fluctuating manner. In other words, its cross sectional velocity profile will tend to fluctuate in a random manner. In addition, in an actual embodiment of the dye laser amplifier, the dye flow path forms an annular pattern as it makes its 180° turn and enters the dye cell assembly. Therefore, there is a tendency for some of the dye to stagnate at the top of the cylindrical chamber vessel just above the rectangular dye cell assembly inlet.

In accordance with the present invention, the dye laser amplifier includes flow control means located within the vessel chamber above the inlet to the dye chamber for acting on the dye stream as the latter is caused to flow through its 180° turn in order to insure that the stream flows into the dye chamber inlet in a stable and uniform manner. In an actual working embodiment of the present invention, the flow control means is comprised of a screen which is positioned over the dye chamber inlet and which has an entirely circumferential main body extending across the path of flow of the dye stream aiding the latter in making its 180° turn. The screen is configured so that the dye stream passing through it at any point along the screen does so substantially perpendicular thereto. Moreover, an unscreened opening is provided at the top of the screen to eliminate any possibility of stream stagnation there and to generate a stabilizing higher velocity jet.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall dye laser amplifier disclosed herein and particularly the way in which it causes its dye stream to pass through to its dye cell in a substantially turbulent free and stagnation free manner will be described in more detail hereinafter in conjunction with the drawings wherein:

FIG. 1 is a diagrammatic illustration, in side elevational view, of an overall dye laser amplifier including a dye cell arrangement contained within a support vessel and high stream flow control means designed in accordance with the present invention;

FIG. 2 is a top plan view of the support vessel forming part of the dye laser amplifier illustrated in FIG. 1;

FIG. 3 is a front end elevational view of the support vessel illustrated in FIGS. 1 and 2;

FIG. 7 is an enlarged sectional view, in side section, of the support vessel illustrated in FIGS. 1-3, particularly illustrating its internal components including a dye cell assembly shown in FIG. 1 and a screen arrangement illustrated in FIGS. 5 and 6;

FIG. 8 is a sectional view taken generally along line 8—8 in FIG. 7; and.

FIG. 9 is a sectional view taken along line 9—9 in FIG. 7.

DETAILED DESCRIPTION OF THE INVENTION

Figure 5:
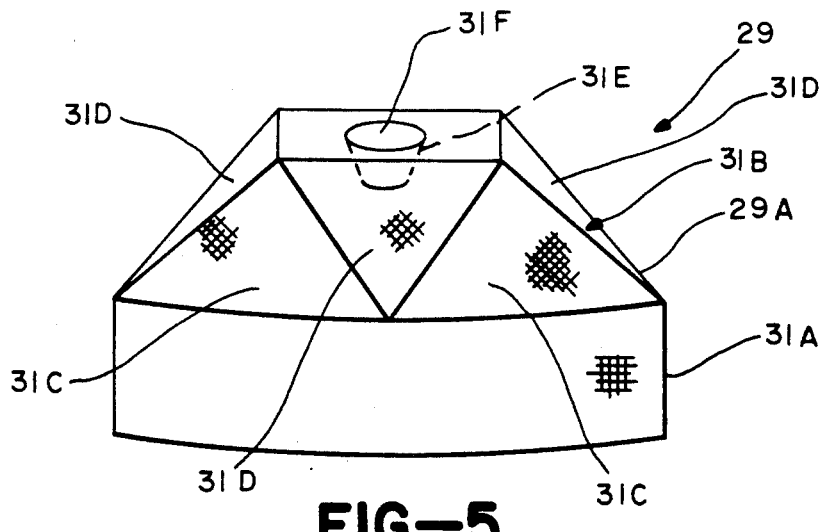
FIG. 5 is a perspective view of a screen arrangement which is designed in accordance with the present invention to act on the dye stream as the latter flows through its 180° turn in order to insure that the stream flows into the dye chamber assembly inlet in a stable and uniform manner.

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Turning now to the drawings, wherein like components are designated by like reference numerals throughout the various Figures, attention is first directed to FIGS. 1-4 illustrating a support vessel 10 which forms part of an overall dye laser amplifier 11. As indicated previously, the dye laser amplifier includes a dye cell defining a dye chamber in which a continuous replenished supply of dye is excited by a first light beam in order to amplify the intensity of a second different light beam passing through the dye. The dye cell assembly is shown in FIG. 1 by dotted lines at 12 and forms part of an overall dye cell assembly 14 contained entirely within an internal chamber 16 defined by the support vessel. The vessel also includes pipe means 18 defining an inlet 20 into the vessel and pipe means 22 defining an outlet 24 out of the vessel. The inlet 20 is designed to accommodate passage of the above recited dye stream into vessel chamber 16 before entering the dye cell assembly and outlet 24 is designed to accommodate passage of the dye stream out of the vessel.

Figure 4:
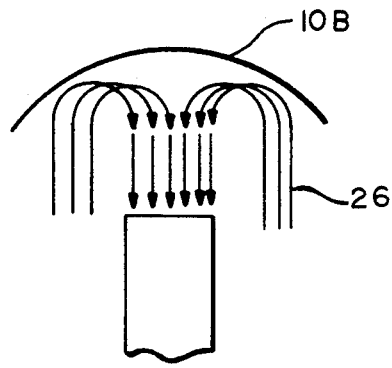
FIG. 4 diagrammatically illustrates the way in which a dye laser amplifier's dye stream makes a 180° turn just before entering the amplifier's dye cell.

The dye steam itself is diagrammatically represented by the arrows 26 in FIGS. 1, 2 and 4 along with suitable means 27 for producing the dye stream. As seen there and as will be described in more detail hereinafter with regard to FIGS. 7-9, the dye stream initially enters vessel chamber 16 after it first passes through inlet 20 and thereafter flows around the dye cell assembly and vertically upward toward the top of the vessel chamber forming an annular flow pattern as it does so. The stream then makes a 180° turn, changing to a rectangular shape, and then flows downward into and through the dye chamber 28 defined by the dye cell. As the dye stream makes it 180°turn, it passes through a screen device 29 which will be described in more detail hereinafter in conjunction with FIGS. 5 and 6. For the moment is suffices to say that the screen device acts on the dye stream to insure that the latter passes into the dye cell in a substantially turbulent-free, stagnation-free manner. Thereafter, the stream flows through the bottom of the dye assembly and out of the support vessel through outlet 24.

As stated above, as dye stream 26 passes through dye chamber 28, it is excited by a first light beam in order to amplify the intensity of a different second light beam. The first light beam is diagrammatically represented by the arrow 30 in FIG. 1 along with means generally indicated at 32 for producing that beam. In a contemplated embodiment of the present invention, the means 32 is a copper vapor laser and the beam is a copper vapor laser (CVL) beam. In that same contemplated embodiment, two such beams 30 are used to excite the dye along with two such means for producing the beam (or one means plus the appropriate optics). The second beam is shown in FIG. 1, first at 34 before it enters the dye cell and then at 36 in its amplified state after it passes through the dye cell. Means generally indicated at 38 for initially providing the beam 34 is shown in FIG. 1. Means 38 could be a dye laser oscillator or another dye amplifier. In any case, the support vessel itself includes a pair of first openings 40 for accommodating passage of beams 30 into dye chamber 28 and a pair of second openings 42 for accommodating the passage of beam 34, 36 through the dye chamber.

Figure 6:
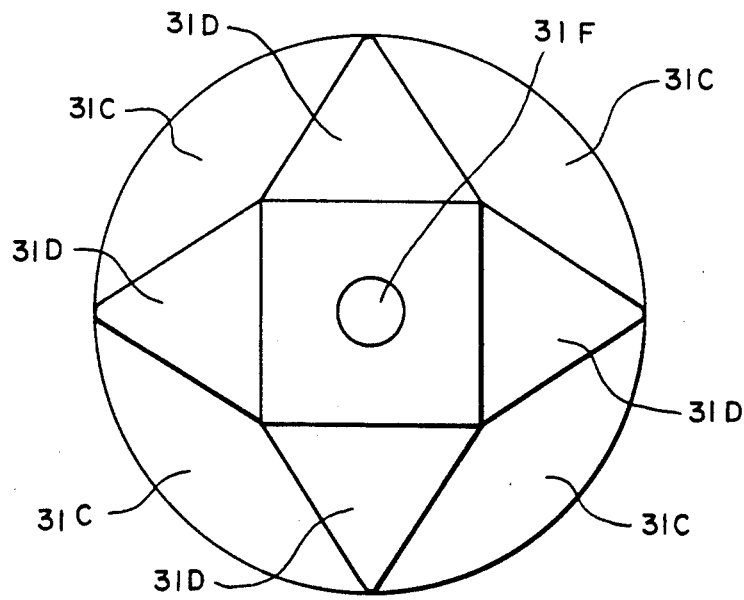
FIG. 6 is a top plan view of the screen arrangement of FIG. 5.

As indicated above, dye stream 26 enters inlet 20 of vessel 10 near the bottom of the vessel. Part of the stream upon entering the vessel chamber, passes around the dye cell arrangement and means located within the vessel chamber for supporting the dye cell assembly. Thereafter, the entire stream moves vertically upward, entirely around the dye cell assembly, in the form of an annulus. Eventually it reaches the top of the dye chamber and makes its 180° turn, before entering the dye cell. As it does so, it passes through screen device 29. This device is best illustrated in FIGS. 5 and 6. As seen there, the screen device includes a main body 29a which is formed in its entirety of a screen material of a predetermined size depending upon the rate of flow of stream 26. In one embodiment, the screen defines a mesh opening of relatively high porosity.

Still referring to FIGS. 5 and 6, body 29a of screen device 29 is shown including a vertically extending, annular rim 31a which is located at its lowermost end and which defines the lateral boundary of the inlet to dye cell assembly 14, as best illustrated in FIG. 7. The screen device also includes an upper generally frusto-conical section 31b comprised of eight distinct segments, four of which are indicated at 31c and four of which are indicated at 31d. Note that the segments 31c and 31d alternate with one another circumferentially around overall section 31b. Also note that segments 31c end before reaching the top of the screen device while segments 31d turn down on themselves so as to define what may be described as an inverted frusto-conical funnel 31e which is best illustrated in FIGS. 5 and 7. As best seen in FIG. 6, this funnel defines an unscreened, circular shaped opening 31f which is located directly above and in coaxial relationship with the vertical axis of dye chamber 12. The particular way in which screen device 29 acts on dye stream 26 will be described in detail hereinafter.

Having described screen device 29 structurally, attention is now directed to FIGS. 7-9 for a discussion of the detailed structure making up the vessel and dye cell assembly. Referring particularly to FIG. 7, main body 10A of support vessel 10 is shown including pipe means 18 defining an inlet 20. Inlet pipe means 18 leads into previously recited vessel chamber 16 which at its lower end surrounds a dye cell support structure 50 integrally formed with vessel body 10A. The dye cell support structure carries with it a flow spreader ring 52 which extends radially outward into the vessel chamber just above inlet 20. A splitter ring 54 is disposed directly under the flow spreader at the inlet entrance. As dye stream 26 enters the vessel chamber through inlet 20 it is first caused to flow around the entire support structure 50 and the lower annular section of region 16L of vessel chamber 16. Thereafter it passes up through the flow spreader ring into an upper annular section or region 16U of chamber 16. The flow spreader ring serves to distribute the flow into the upper annular region 16U from the lower annular region 16L so that the flow upward is uniform around support structure 50.

Stream 26 continues to flow upward in upper annular region 16U toward the top region 16T of chamber 16 and, in doing so, must pass four horizontally extending, equally circumferentially spaced pipes, two of which are shown in FIG. 4. The pipes so shown are generally indicated at 56 and serve to define the previously recited openings 42 for accommodating passage of dye beam 34, 36 as the latter passes through the support vessel and dye cell 28. The other two pipes are shown at 58 in FIG. 6 and serve to define previously recited openings 40 for accommodating passage of the copper vapor laser beams 30 into the dye cell. In order to insure that the dye stream flow passes these four pipes in a smooth manner as it enters top region 16T of chamber 16, a flow vane 60 is mounted directly above each pipe so that there are four vanes in all, although only two are shown. While each of these vanes is shown somewhat rectangular in cross-section, in side section each is wedge shaped with its base somewhat rounded to conform to and rest on a cooperating segment of the outer surface of its associated pipe while its top end is pointed upward.

After the dye stream passes into region 16T of vessel chamber 16 it is directed into the inlet of dye cell assembly 14 through screen device 29. The dye cell assembly is comprised of a dye cell 12 defining previously recited dye chamber 28 and a cap arrangement 62 which defines an inlet 63 into the dye cell and which supports a screen device 29 in the manner shown in FIG. 7. The dye cell 12 is supported in an unconnected fashion by and partially within dye cell support arrangement 50, as illustrated in FIG. 4, so that its dye chamber 28 is in appropriate optical communication with the openings 40 and 42, thereby allowing the dye beam to enter and pass through the dye chamber and allowing the CVL beams to enter the dye chamber at the same time. The cap arrangement 62 includes a top cap 65 and inlet tube 66 which supports a honeycomb filter 70. In order to remove the dye cell from the support vessel, it is only necessary to disconnect the top cap 10B forming part of the vessel from its main body 10A and thereafter lift out the combination screen 64 and cap arrangement 62. This makes the dye cell itself readily accessible so that it can be pulled out of its position within the support arrangement 50, as described in more detail in applicant's copending application Ser. No. 911,272, entitled DYE LASER AMPLIFIER INCLUDING A DYE CELL filed Sep. 22, 1986, which application is incorporated herein by reference. Note that there are no connecting parts which must be disconnected. There are however a number of different o-rings which serve to seal the various components in position when the dye cell assembly is in place. In this latter regard, while the dye cell assembly is not structurally connected to the rest of the support vessel, it is designed to fit in place in a snug, seal engaging fashion.

With the dye cell assembly 14 in its operating position, as shown in FIG. 4, dye stream 26 enters inlet 63 through screen 29. The screen device which was described previously in conjunction with FIGS. 5 and 6 is designed to cause stream 26 to enter inlet 63 in a smooth controlled manner with substantially no stagnation at the top of region 16T. Once the stream enters inlet 63 it passes through honeycomb flow straightener 70, turbulence reducing screen 68 and into and through dye chamber 28. Thereafter, it flows out of the dye cell and past a high speed vane corner 72 and out through inlet 24.

Still referring to FIG. 7, the way in which screen device 29 acts on stream 26 to cause the latter to make its 180° turn in a stable and uniform manner will be explained. As seen in FIG. 7, the screen body 29 is configured so that a dye stream passing through it at any point does so substantially perpendicular to the main body at that point. Each hole defined by the screen acts as its own venturi, thereby controlling its own segment of the stream such that the entire stream is under control. Without the screen, the stream would be unstable as it makes its 180° turn and thereby produce a high degree of turbulence. At the same time that most of the stream passes through the screen, the top portion thereof flows freely through unscreened opening 31$f$ in a vertically downward direction. This accomplishes two objectives. First, it eliminates any stagnation of the stream at the top of the screen, which might otherwise result without the unscreened opening. Second, as part of the stream moves vertically downward through the unscreened hole, it forms a core of flowing dye through the stream and thus core acts as a stabilizer for the rest of the stream passing through the screen such that the entire stream moves more smoothly into and through the dye cell.

The foregoing description of a preferred embodiment of the invention has been presented for purposed of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. In a dye laser amplifier including a dye cell defining a dye chamber having an inlet through which continuous, replenished stream of dye is caused to flow and in which the stream is excited by a first light beam in order to amplify the intensity of a second different light beam passing through the dye, said amplifier including means for directing said first beam into said chamber, means for directing said second beam into and through said chamber, and means for directing said continuous stream of dye through said chamber, the improvement comprising:

(a) a support vessel defining a vessel chamber and including
 (i) means for supporting said dye cell within said vessel chamber such that the dye chamber extends vertically with its inlet near the top of the vessel chamber,
 (ii) opening means for accommodating passage of said first beam into said dye chamber and passage of said second beam through said dye chamber,
 (iii) inlet means located near the bottom of said vessel chamber for accommodating passage of said dye stream into said vessel chamber, the latter being configured such that the dye stream thereafter is caused to flow vertically upward toward the top of the vessel chamber and then vertically downward upon reaching the top of said vessel chamber, making a 180 turn and then passing into the inlet of said dye chamber and through the latter, and
 (iv) outlet means for accommodating passage of said dye stream out of said vessel chamber after passing through said dye chamber; and
(b) flow control means located within said vessel chamber above the inlet to said dye chamber for acting on said dye stream as the latter is caused to flow through its 180 turn in order to insure that the stream flows into the dye chamber inlet with negligible turbulence and negligible stagnation;
(c) said vessel chamber extending entirely around said dye cell so as to form an annulus and said dye stream being caused to flow vertically upward from the inlet to said vessel chamber around the entire circumference of said dye cell and thereafter vertically downward into the dye chamber inlet forming an annular flow pattern as it makes said 180 turn, said flow control means acting on said entire annular flow pattern in order to insure that the stream flows into the dye chamber inlet in a stable and uniform manner.

2. The improvement according to claim 1 wherein said flow control means includes a screen which is positioned over the dye chamber inlet and which has an entirely circumferential main body extending across said annular flow pattern, and an unscreened opening at the top of said main body in direct vertical alignment with the dye chamber inlet.

3. The improvement according to claim 2 wherein the main body of said screen is configured so that the dye stream passing through it at any point along said main body does so substantially perpendicular to the main body at that point.

4. The improvement according to claim 3 wherein said screen includes a circumferential section curving inward and downward from a top end of said main body into the latter so as to define said unscreened opening.

5. In a dye laser amplifier including a dye cell defining a dye chamber having an inlet through which a continuous, replenished stream of dye is excited by a first light beam in order to amplify the intensity of a second different light beam passing through the dye, said amplifier including means for directing said first beam into said chamber, means for directing said second beam into and through said chamber, and means for directing said continuous stream of dye through said chamber, the improvement comprising:

(a) a support vessel defining a vessel chamber and including
 (i) means for supporting said dye cell within said vessel chamber such that the dye chamber extends vertically with its inlet near the top of the vessel chamber,
 (ii) opening means for accommodating passage of said first beam into said dye chamber and passage of said second beam through said dye chamber,
 (iii) inlet means located near the bottom of said vessel chamber for accommodating passage of said dye stream into said vessel chamber, the latter being configured such that the dye stream thereafter is caused to flow vertically upward toward the top of the vessel chamber and then vertically downward upon reaching the top of said vessel chamber, making a 180° turn and then passing into the inlet of said dye chamber and through the latter, and
 (iv) outlet means for accommodating passage of said dye stream out of said vessel chamber after passing through said dye chamber; and
(b) flow control means located within said vessel chamber above the inlet to said dye chamber for acting on said dye stream as the latter is caused to flow through its 180° turn, said vessel chamber extending entirely around said dye cell so as to form an annulus and said dye stream being caused to flow vertically upward from the inlet to said vessel chamber around the entire circumference of said dye cell and thereafter vertically downward into the dye chamber inlet transitioning to a rectangular pattern as it makes said 180° turn, said flow control means including a screen which is positioned over the dye chamber inlet and which has an entirely circumferential main body extending across said annular flow pattern and an unscreened opening at the top of said main body in direct vertical alignment with the dye chamber inlet, the main body of said screen being configured so that the dye stream passing through it does so substantially perpendicular to the main body at that point.

6. The improvement according to claim 5 wherein said screen includes a circumferential section curving inward and downward from a top end of said main body into the latter so as to define said unscreened opening.

* * * * *